June 22, 1965

F. P. LESTER 3,190,679

HOSE CONNECTOR

Filed May 20, 1963

INVENTOR.
FRANK P. LESTER
BY
ATTORNEY

United States Patent Office 3,190,679
Patented June 22, 1965

3,190,679
HOSE CONNECTOR
Frank P. Lester, 75 Mercer Ave., Hartsdale, N.Y.
Filed May 20, 1963, Ser. No. 281,726
3 Claims. (Cl. 285—8)

This invention relates to hose connectors and more specifically to a novel and improved means for connecting the ends of hoses, conduits, and the like one to the other and to fluid supply devices such as water faucets and the like.

Numerous devices having a flexible hose for attachment to a faucet and terminating in a shower head or other water distribution means are generally available for use as portable showers, and for rinsing hair, dish washing and the like. While these devices are quite effective, considerable difficulty has been encountered in providing satisfactory means for attaching the hose to the faucet particularly in cases when the faucet terminates in an essentially smooth cylindrical spout. Many modes of attachment have been suggested which include ribbed conical elements carried on the end of the hose for friction engagement with the faucet, while others have more complicated arrangements which purportedly rely on water pressure for effecting a firm attachment of the hose with the faucet spout. These devices have not been found satisfactory, and in many cases, the pressure of the water ultimately urges the hose out of engagement with the faucet with the result that a substantial amount of water is splashed about the area immediately surrounding the faucet, and oftentimes considerable water is splashed on the user which is both annoying and harassing.

This invention overcomes the difficulties heretofore encountered with prior hose attaching devices and provides a novel and improved hose connector affording a secure, reliable attachment of the hose to a faucet and which will withstand substantial water pressure.

Another object of the invention resides in a novel and improved connector that may be quickly and easily used to connect fluid conduits one to the other and to water faucets and the like.

Still another object of the invention resides in the provision of a novel and improved pneumatically operated connector for hoses, conduits and the like.

A still further object of the invention resides in the provision of a novel and improved hose to faucet connector.

The above and other objects and advantages of the invention will become more apparent from the following description and accompanying drawings forming part of this application.

Figure 1:
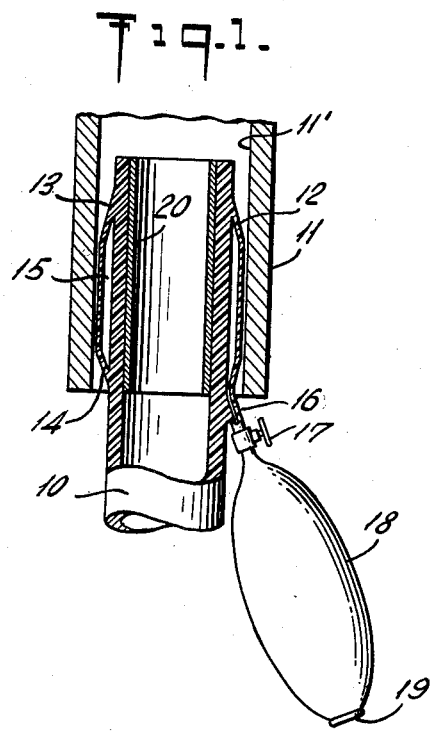
FIGURE 1 is a cross-sectional view of one embodiment of the invention inserted within a faucet spout for attachment thereto.
Figure 2:
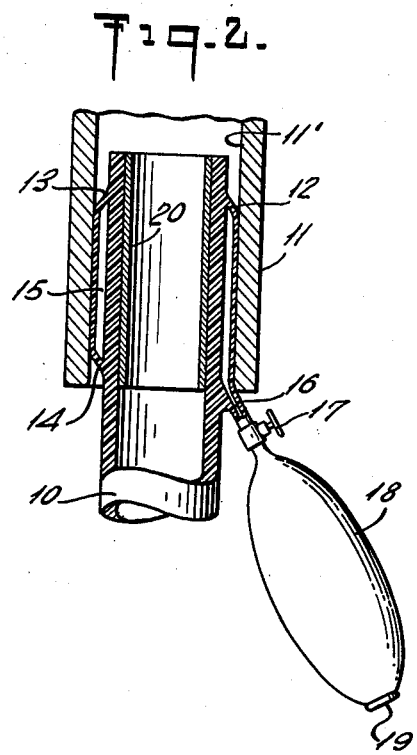
FIGURE 2 is a cross-sectional view of the structure shown in FIGURE 1 when firmly secured within a faucet spout.

One embodiment of a hose connector in accordance with the invention is illustrated in FIGURES 1 and 2. In these figures, the hose to be connected to the faucet is generally denoted by the numeral 10, while the generally cylindrical spout of the faucet is denoted by the numeral 11. It will become apparent as the description proceeds that the structure now to be described is adaptable for use in connection with faucet spouts having other configurations such as polygons, ovals and the like, provided, however, that there is ample room within the central opening 11′ of the faucet to receive the connector.

The hose connector in the instant embodiment of the invention may be formed in any desired manner and may either be permanently attached to the end of the hose or formed as a separate coupling element that may be secured to an existing hose by a suitable coupling member, as, for instance, an internal sleeve and clamping means. Sleeves and clamping means are conventional devices for connecting hoses in end-to-end relationship, and accordingly, an illustration has been deemed unnecessary.

More specifically, the connector shown in FIGURES 1 and 2 comprises a resilient element 12 which surrounds the end of the hose 10 and is secured about its upper and lower edges 13 and 14 to the hose 10 to form an air tight seal with an air space 15 disposed between the surrounding element 12 and the outer wall of the hose 10. A tube 16 is sealed in the wall of the element 12 with the opening in the tube communicating with the space 15. The outer end of the tube 16 carries a valve 17 and a hand-operated bulb 18. The bulb 18 is of conventional configuration and formed of a resilient material. It includes a flow or check valve 19 in the outer end thereof which operates to permit air to flow into the bulb when the latter expands from the compressed condition. When the valve 17 is closed, compression of the bulb 18 causes air contained therein to be forced through the tube 16 and into the space 15 to create a pressure within the space 15 and resultant expansion of the resilient element 12. Expansion of the element 12 will cause it to firmly engage and frictionally lock against the internal wall 11′ of the faucet spout 11 as shown more clearly in FIGURE 2. As long as the valve 17 is in the closed position, air will be retained within the space 15 and hold the hose securely in position within the faucet. In cases where the hose wall is relatively thin or is fabricated of a resilient material, it is desirable to use an internal stiffening element 20 of a metal or plastic to prevent collapse of the hose 10 when pressure is created within the chamber 15.

To release the hose from the faucet, it is merely necessary to open the valve 17 to permit the air within the chamber 15 to escape to the atmosphere. This collapses the element 12 and permits disengagement of the connector.

In the form of the invention described above, the chamber 15 is provided by the attachment of a surrounding element 12 to the hose itself. If desired, the attaching means may be made as an independent element in the form of an elongated, hollow-walled, inflatable cylinder of resilient material and having the tube 16, relief valve 17 and bulb 18 secured thereto and in communication with the chamber defined by the cylinder walls. This structure may then be cemented or otherwise attached to the end of a hose and operated in the same manner as described above.

Figure 3:
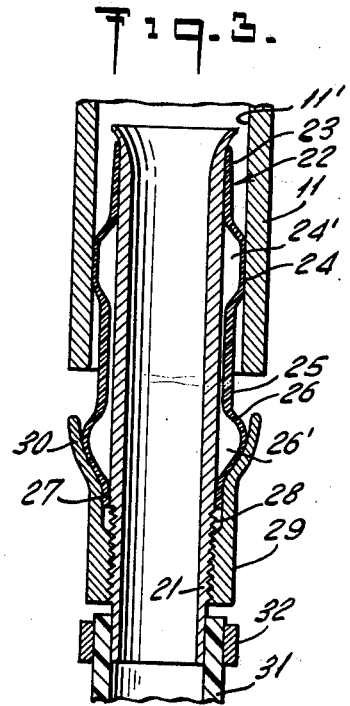
FIGURE 3 is a cross-sectional view of a modified embodiment of the invention.

A modification of the invention is shown in FIGURE 3 and differs from the structure illustrated in FIGURES 1 and 2 essentially in means for pneumatically expanding the connecting means to effect a secure attachment to the faucet 11. More specifically, the connector has a tubular element of relatively stiff metal or plastic tube 21 which is inserted into the faucet spout. A surrounding element generally denoted by the numeral 22 surrounds the tube 21 and has an upper end portion 23 cemented directly thereto. Just below the end portion 23 is an enlarged inflatable portion 24 of somewhat thinner section to permit it to readily expand and contract. This portion is followed by a cylindrical portion 25 of relatively thick section which is in slightly spaced relationship to the tube 21 in order to provide for the flow of air into and out of the chamber 24′ defined by the portion 24. Below the relatively heavy portion 25 is an enlarged portion 26 having a wall thickness somewhat thinner than the wall portion 24 and defining a chamber 26'. The bottom edge of the element 22 is sealed at 27 to the tubular element 21. The element 21 is further provided with screw threads 28 and a collar 29 threadably engaged therewith. The upper portion 30 of the collar is inclined outwardly to engage the wall of the chamber 26'.

With this arrangement, as the collar 29 is rotated to shift it upwardly, it will compress the air in the chamber 26' and force it into the chamber 24' expanding the walls of the latter chamber and securing the connector in place. A flexible hose 31 may be secured to the lower end of the tube 21 by any suitable means, as, for instance, a surrounding clamp 32. To release the connector from engagement with the faucet 11, the collar 29 need only be rotated in the direction to move it downwardly away from the chamber 26'. In so doing, the walls of the chamber 24' will collapse and force the air downwardly into the chamber 26'.

Figure 4:
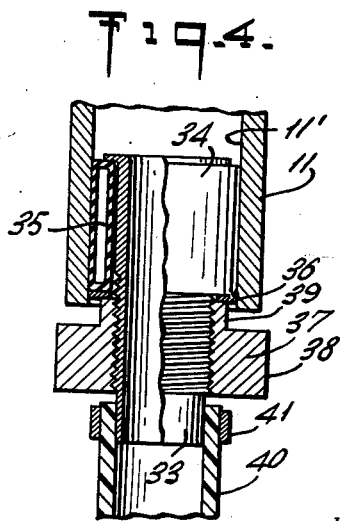
FIGURE 4 is a cross-sectional view of still another embodiment of the invention.

Still another embodiment of the invention is shown in FIGURE 4. This embodiment includes an elongated tube 33 of metal or plastic having an outwardly extending flange 34 on the upper end thereof. A hollow cylindrical element 35 of resilient material such as rubber or the like and having a chamber 35' surrounds the tube 33 with its upper end in contiguous relationship with the flange 34. A washer 36 is placed against the bottom side of the cylindrical element 35, and a cylindrical nut 37 having a knurled surface 38 threadably engages the tube 33. The upper portion 39 of the nut 37 is of reduced section and bears against the underside of the washer 36. When the connector is inserted into the faucet, the nut 37 is rotated in a clockwise direction compressing the element 35 and causing it to expand outwardly to tightly engage the internal wall 11' of the faucet spout 11. To disengage the connector, the nut 37 need merely be rotated in a counterclockwise direction and away from the cylindrical element 35. A flexible hose 40 is attached to the lower end of the tube 33 by a surrounding clamp 41 or other suitable means.

While the invention has been described above for the purpose of attaching a portable hose or conduit to the spout of a water faucet, it is evident that the same connecting means may be utilized for attaching hoses and other fluid conduits in end-to-end relationship. For instance, the spout of the water faucet denoted by the numeral 11 can be a female connector attached to another hose or conduit.

While only certain embodiments of the invention have been illustrated and described, it is apparent that alterations, modifications and changes may be made without departing from the true scope and spirit thereof as defined by the appended claims.

What is claimed is:

1. Apparatus for securing a tubular member within a faucet spout comprising an inflatable element surrounding one end of said member and adapted to be inserted in said spout, a second inflatable element surrounding said member externally of said spout, fluid transfer means interconnecting said elements, and mechanical means for compressing said second element with said first element within the spout and for holding said second element in the compressed condition to secure said member within the spout.

2. Apparatus according to claim 1 wherein the resistance of said first element to inflation is greater than the resistance to said second element.

3. Apparatus according to claim 1 wherein said compressing means comprises a collar threadably carried by said member and a flared annular member carried by said collar and surrounding said second inflatable element and operable to compress the last said element.

References Cited by the Examiner

UNITED STATES PATENTS

| | | | |
|---|---|---|---|
| 2,015,081 | 9/35 | McElhany | 285—97 X |
| 2,343,774 | 3/44 | Klein | 285—8 |
| 3,075,535 | 1/63 | Lasting | 285—97 X |

CARL W. TOMLIN, *Primary Examiner.*